United States Patent [19]

Morishita et al.

[11] Patent Number: 4,674,963
[45] Date of Patent: Jun. 23, 1987

[54] SCROLL TYPE MACHINE WITH TILTING THRUST BEARING

[75] Inventors: Etsuo Morishita; Hiroshi Narumiya; Masayuki Kakuda, all of Hyogo; Masahiro Sugihara, Aichi, all of Japan

[73] Assignee: Mitsubishi Denki Kabushiki Kaisha, Tokyo, Japan

[21] Appl. No.: 739,268

[22] Filed: May 29, 1985

[30] Foreign Application Priority Data

May 29, 1984 [JP] Japan ................................ 59-111753
Aug. 10, 1984 [JP] Japan ................................ 59-168236

[51] Int. Cl.$^4$ .......................... F01C 1/04; F01C 21/02; F16C 17/06
[52] U.S. Cl. ...................................... 418/55; 418/83; 384/306
[58] Field of Search .......................... 418/55, 57, 83; 384/122, 306, 308

[56] References Cited

U.S. PATENT DOCUMENTS 1,102,276  7/1914  Kingsbury .......................... 384/308
1,117,503 11/1914  Kingsbury .......................... 384/308
4,322,116  3/1982  Heinemann et al. ................. 384/306

FOREIGN PATENT DOCUMENTS 0010930  5/1980  European Pat. Off. .
0123407 10/1984  European Pat. Off. .
54-100512  8/1979  Japan .................................... 418/55
57-173585 10/1982  Japan .................................... 418/55
58-113594  7/1983  Japan .................................... 418/55

Primary Examiner—John J. Vrablik
Attorney, Agent, or Firm—Sughrue, Mion, Zinn, Macpeak, and Seas

[57] ABSTRACT

A scroll type hydraulic machine having an improved thrust bearing structure, whereby the thrust bearing is capable of tilting radially and peripherally. The thrust bearing is preferably composed of at least three sectors, and an anti-rotation member is provided between adjacent ones of the sectors. A bearing support is provided, a portion of which has the form of a ball. The thrust bearing is surrounded by an annular portion whose height is substantially the same as that of the thrust bearing.

17 Claims, 32 Drawing Figures

FIG. 20A
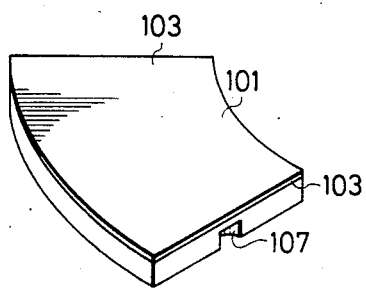
FIG. 21
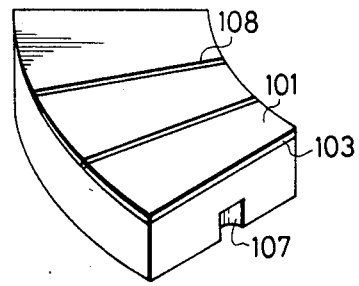
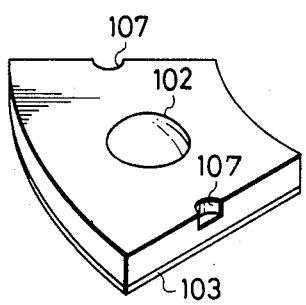
FIG. 20B

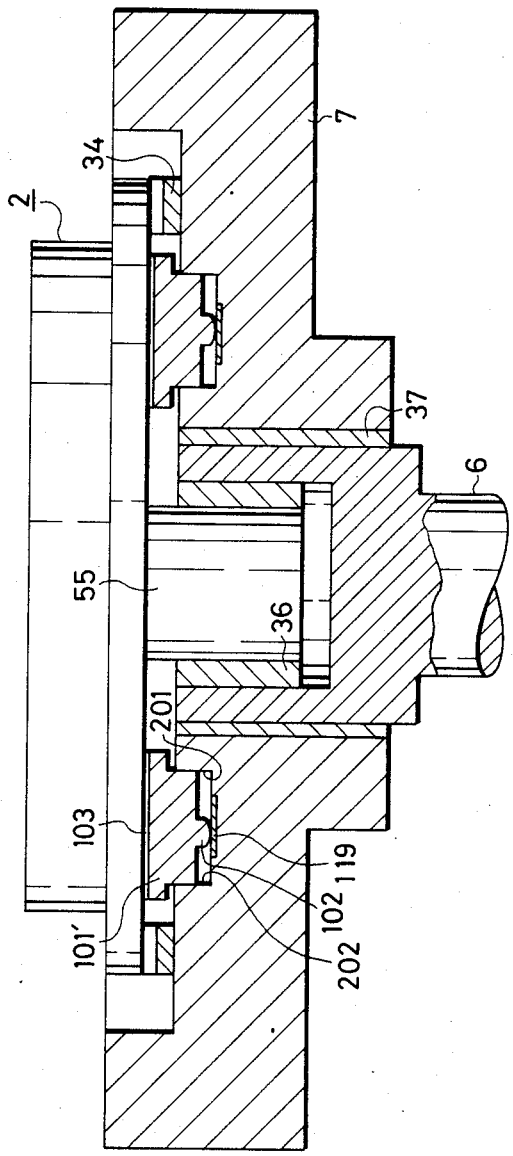

SCROLL TYPE MACHINE WITH TILTING THRUST BEARING

BACKGROUND OF THE INVENTION

The present invention relates to a scroll type fluid machine and, more particularly, to a structure of a thrust bearing of a scroll type fluid machine.

Fundamental components of a scroll type compressor, which is a typical example of a fluid machine, are shown in FIG. 1, in which a reference numeral 1 depicts a stationary scroll, 2 an orbiting scroll, 3 a discharge port, 4 compression chambers, 0 a fixed point on the orbiting scroll, and 0' a fixed point on the orbiting scroll. The stationary scroll 1 and the orbiting scroll 2 are constituted by wraps having the same convolutions and formed of a combination of involutes of arcs or the like, as is well known.

In operation, the orbiting scroll 2 is assembled with the stationary scroll 1 as shown in FIG. 1. The stationary scroll 1 is moved in an orbiting motion without changing its angular attitude, i.e., it orbits through angles 0°, 90°, 180° and 270° as shown in the figure. With the orbital movement of the orbiting scroll 2, the volumes of crescent shaped compression chambers 4 formed between the wraps of the stationary scroll 1 and the orbiting scroll 2 are reduced sequentially to take in and compress fluid. The compressed fluid is moved towards the center and discharged through the discharge port 3. During this operation, the distance between the fixed points 0 and 0' is held constant, which distance is expressed by $00' = p/2 - t$, where p and t are the gap length between the wraps and the thickness of the wraps, respectively. In this case, p corresponds t the pitch of the wraps.

Next, the detailed construction of such a scroll type compressor and its operation will be described.

FIG. 2 shows an example of such a scroll type compressor which may be used in a refrigerator or air conditioner and which is of the so-called semi-sealed type. In FIG. 2, reference numeral 1 is a stationary scroll, 2 an orbiting scroll assembled with the stationary scroll 1, 3 a discharge port, 4 compression chambers, 55 a shaft of the orbiting scroll, 6 a crankshaft having an eccentric hole 42 in which the orbiting scroll shaft 55 is fitted to orbit the orbiting scroll 2, 7 a bearing support for the orbiting scroll 2, 8 the rotor of an electric motor, 9 the stator thereof, 10 a first balancer, 11 a second balancer, 12 a key I for fixedly securing the first balancer 10 to the crankshaft 6, 13 a spacer, 14 a key II for fixedly securing the rotor 8 to the crankshaft 6, 15 a washer I, 16 an anti-rotation washer, 17 a rotor fixing nut, 18 a stirrer, 19 bolts I for securing the second balancer 11 to an end ring 75 of the rotor 8, 20 a discharge chamber connected to the discharge port 3, 21 bolts II for securing the discharge chamber 20, the stationary scroll 1, the orbiting scroll 2 and the bearing 7 to a shell 23, 22 an O ring, 24 bolts for securing the stator, 25 a washer II, 26 a support ring, 27 a bottom plate, 28 a hole formed in the bottom plate 27, 29 to 32 blind screw holes I, II, III and IV, 33 an oil hole, 34 an Oldhams coupling for preventing the orbiting scroll 2 from rotating about its axis, 35 a thrust bearing assembled in the bearing 7, 36 a metal bearing sleeve I for reducing friction between the eccentric hole 42 and the orbiting scroll shaft 55, 37 a metal bearing sleeve II for reducing friction between the crankshaft 6 and the bearing 7, 38 a thrust receiver for receiving thrust on a stepped portion of the crankshaft 6, 39 a metal bearing sleeve III for reducing friction between an end portion of the crankshaft 6 and the bottom plate 27, 40 a hermetic terminal I, 41 a hermetic terminal II, and 42 an eccentric hole of the crankshaft.

FIG. 3 is a cross section taken along a line III—III in FIG. 2, in which reference numeral 43 indicates Oldhams guide grooves which receive projection 59 of the Oldhams coupling (see FIG. 9), 44 an intake port, 45 an O ring groove I, 46 bolt holes I, and 47 a female screw I. In FIG. 4, which is a cross section taken along a line IV—IV in FIG. 2, reference numeral 48 indicates a communicating portion.

Various components of the scroll type compressor constructed as above will be described in more detail.

FIGS. 5a and 5b show the stationary scroll 1 having the discharge port 3, in which reference numeral 49 is the stationary scroll wrap, 50 a base plate forming a base of the stationary scroll 1, 51 a through-hole II for bolts, and 52 spot facings for bolts for securing the stationary scroll 1. The stationary scroll 1 has the form of a thick disk having a convoluted groove cut therein forming the wrap 49.

The discharge port 3, formed in a central portion of the base plate 50, has a thread cut in its inner surface. The spot facings 52 are formed so that, when the discharge chamber 20 is assembled therewith, head portions of the assembling bolts do not protrude from the mating surface.

FIG. 6 shows the orbiting scroll 2, in which reference numeral 53 depicts the wrap, 54 a base plate, 55 the orbiting scroll shaft, and 56 projections for the Oldhams coupling. The orbiting scroll wrap 53 is formed integrally with the base plate 54, as are the projections 56 and the scroll shaft 55.

FIG. 7 shows a rear view of the orbiting scroll 2, in which reference numeral 57 depicts a balancer fixed thereto by bolts 58. The center of the scroll shaft 55 coincides with the center of the base plate 54. The projections 56, having lengthwise axes passing through the center of the base plate, are engaged with the Oldhams coupling 34 to restrict the rotation of the orbiting scroll 2 about its axis. The orbiting scroll shaft 55 is fitted in the eccentric hole 42 of the crankshaft 6 shown in FIG. 2 and is driven by a rotational force transmitted from the rotor 8 through the crankshaft 6 to realize eccentric orbiting movement of the orbiting scroll 2. The balancer 57 functions to compensate for static unbalance due to the fact that the center of gravity of the warp 53 of the orbiting scroll 2 does not coincide with the center of the base plate 54 and hence the orbiting scroll shaft 55. With this balancer, the center of gravity of the orbiting scroll 2 is made coincident with the center of the orbiting scroll shaft 55.

FIG. 8 shows the main bearing support 7. The crankshaft 6 (FIG. 2) is fitted in the metal bearing sleeve II 37 of the bearing support 7 so that the stepped portion of the crankshaft 6 rides on the thrust receiver 38. The thrust bearing 35 supports the rear side of the orbiting scroll base plate 54 against thrust transmitted from the orbiting scroll 2. In some cases, it functions to provide a supporting force equal to or larger than the thrust of the orbiting scroll 2 by introducing an oil pressure on the surface of the thrust bearing 35. The Oldhams guide grooves 43 receive the projections of the Oldhams coupling 34 in such a manner that the projections can reciprocate in the grooves. Four intake ports 44 are provided in this example which penetrate the bearing support 7.

The O ring groove 45 formed in an end face of the bearing support 7 performs sealing. Threaded screw holes 47 for assembling the bearing support 7 and the stationary scroll 1 integrally and a through-hole for the bolts for assembling the compressor are also provided. The oil hole 33 and the blind screw hole IV 32 are also formed therein. The blind screw hole 32 can be used to attach a gauge to measure the pressure of the lubricating oil. An end face of the bearing support 7 in which the through-holes 46 and the threaded screw holes I 47 are formed is higher than the end face of the thrust bearing 35 by a distance corresponding to the sum of the thickness of the orbiting scroll base plate 54 and a distance in a range from 10 to 50 microns so that, when the stationary scroll 1 is fixed to the end face of the bearing support 7, the orbiting scroll 2 can orbit, as clearly shown in FIG. 2.

In FIG. 9, which shows the Oldhams coupling 34, reference numeral 60 depicts guide grooves for receiving the projections 56 of the orbiting scroll 2, and 61 an annular ring.

The Oldhams coupling 34 functions to prevent the orbiting scroll 2 from rotating about its axis and defines, together with the crankshaft 6, the orbit of the orbitins scroll 2. The projections 59 of the Oldhams coupling 34 fit in respective ones of the Oldhams guide grooves 43 of the bearing support 7. A line connecting the projections 59 passes through the center of the ring 61 and forms a right angle to a line connecting the grooves at the center.

When the orbiting scroll 2 moves eccentrically upon rotation of the crankshaft 6, the projections 59 of the Oldhams coupling 34 reciprocate in the Oldhams guide grooves 43 of the bearing support 7, and thus the Oldhams coupling 34 itself reciprocates. Under this condition, the orbiting scroll 2 engaged with the grooves 60 reciprocates relatively with respect to the Oldhams coupling 34. As a result, the orbiting scroll 2 orbits along a composite of the orthogonal reciprocating paths.

In FIG. 10, which shows the crankshaft 6, reference numeral 62 depicts an oil groove I, 63 an oil groove II, 64 a key groove I, 65 a key groove II, 66 a fitting portion of the crankshaft, 67 a rotor mounting portion, 68 a shaft fitting portion, 69 a rotor mounting nut screws, and 70 an anti-rotation washer groove.

The crankshaft 6 is driven by the driving force of the rotor 8 mounted on the rotor mounting portion 67. It in turn drives the orbiting scroll 2 fitted in the eccentric hole 42 in which the metal bearing sleeve I 36 is provided. The metal bearing sleeve I 36 may be made of a known bearing metal alloy. Alternatively, it may be replaced by so-called needle bearing. The metal bearing sleeve 36 is provided at the side opposite to a load side with the oil groove II 63. The shaft fitting portion 66 fits in the metal bearing sleeve II 37 of the bearing support 7, and the stepped portion of the crankshaft 6 is supported by the thrust receiver 38 of the bearing support 7. The oil groove I 62 is also formed in the shaft fitting portion 66 to form an oil supply system. A pair of the oil holes 33 communicate the oil groove I 62 with the oil groove II 63. One of the oil holes 33 penetrates the center of the crankshaft 6 to supply oil to the shaft fitting portion 68. The key groove I 64 is used to secure the first balancer (FIG. 2), and the key groove II 65 is used to mount the rotor 8. The shaft fitting portion 68 is fitted in the metal bearing sleeve II 37 of the base plate 27 (FIG. 2) to restrict radial movement of the crankshaft 6. The rotor mounting screw 69 is engaged with the nut 17 with a projecting portion of the washer 16 being fitted in the washer groove 70.

In FIG. 11, which shows the first balancer 10, reference numeral 71 depicts a balance weight, 72 a cylinder portion, 73 a fixed portion, and 74 a key groove III.

The first balancer 10, together with the second balancer 11, functions to balance the assembly against a centrifugal force arising due to the eccentric orbital movement of the orbiting scroll 2, to thereby assure quiet and smooth running of the rotary system of the machine. The first balancer 10 is fixedly secured to the key groove I 64 of the crankshaft 6 by the key I 12 inserted into the key groove III 74 provided in the fixed portion 73. The balance weight 71 is provided through the cylinder portion 72 in a space formed between the bearing support 7 and the stator 9 so as to minimize the size of the compressor. The mass of the balance weight 71 is minimized by arranging it as close to the shaft of the orbiting scroll 2 as possible and as remote from the center of the crankshaft 6 as possible. If the orbiting scroll 2 is made of cast iron or cast iron containing graphite particles, its weight becomes substantial, and thus it is necessary to make the balance weight heavy correspondingly. However, with the described structure of the compressor, the radial size of the compressor can nevertheless still be minimized.

FIG. 12 shows the rotor 8 of the electric motor. In FIG. 12, reference numeral 75 is an end ring and 76 a key groove IV. The rotor 8 is fixedly mounted to the key groove II 65 of the crankshaft 6 by the key II 14 fitted in the key groove IV 76. The second balancer 11 is provided at one end of the end ring 75 to balance the orbiting scroll 2 and, together with the first balancer 10, minimize the amount of vibration of the machine.

In FIG. 13a, which shows a lower side view of the rotor 8, reference numeral 77 depicts screw holes for mounting the stirrer 18. The second balancer 11 is secured to the end ring 75 by the bolts I 19.

The various components described individually are assembled as shown in FIG. 14. In FIG. 14, the crankshaft 6 is fitted in the bearing 7, and then the Oldhams coupling 34 is inserted into the bearing support 7. Thereafter, the orbiting scroll 2 is fitted through the Oldhams coupling 34 to the crankshaft 6, and then the stationary scroll 1 is secured by the bolts II 78 to the bearing support 7. Following this, the first balancer 10 is mounted to the lower side of the crankshaft 6. The radial position of the rotor 8 is regulated by the spacer 13 with respect to the crankshaft 6. Then, the washers 15 and 16 are inserted into a lower portion of the rotor 8, and the first balancer 10, the spacer 13, and the rotor 8 are assembled and secured to the crankshaft 6 by the nuts 17. As will be clear from FIG. 2, the first balancer 10 abuts against the stepped portion of the crankshaft 6 and serves as a stop. Finally, the second balancer 11 and the stirrer 18 are mounted on the rotor 8 to complete the scroll-rotor assembly.

FIG. 15 illustrates the assembly of the compressor. The discharge chamber 20, having the O ring 22, is secured to the upper end of the scroll-rotor assembly by screwing the bolts III 79 through the stationary scroll 1 into threaded screw holes II 80 formed in the upper surface of the shell 23, to which the stator 9 is secured by the bolts 24. The inner surface of the upper end portion of the shell 23 has formed therein an O ring groove 81 in which the O ring I 22 is received. Reference numeral 82 in FIG. 2 indicates the coil end of the stator 9. As is clear from FIG. 2, a spline is formed in the rear of lower surface of the bearing support 7, which is fitted in the shell 23, for providing a precisely annular air gap between the rotor 8 and the stator 9 of the electric motor.

Hermetically sealed terminals 40 and 41 are mounted on the outer periphery of the shell 23. The hermetic terminal 40, which may be, for example, of a two-pin type, is connected to a winding protection circuit of the stator 9, and the hermetic terminal 41, which may be of a three-pin type, is used to feed three-phase a.c. current to the stator winding. The terminals are insulated from the shell 23.

FIG. 16 depicts the assembly of the bottom plate 27 to the shell 23. In FIG. 16, the metal bearing sleeve 39 of the bearing 88 of the bottom plate 27 is fitted on the shaft fitting portion 68 of the crankshaft 6. A spline 87 facilitates the coaxial arrangement thereof. The bottom plate 27 is secured to the shell 23 by means of threaded screw holes III 85 in a shell flange 84 and bolts IV 89. The screw hole 28 is formed in the bottom plate 27 for fluid intake. The structure shown in FIG. 2 is thus completed.

The operation of the scroll type compressor shown in FIG. 2 will now be summarized.

When three-phase a.c. current is supplied through the terminal 41 to the stator 9, torque is produced in the rotor 8 by which the crankshaft 6 is rotated. The rotary motion of the crankshaft 6 is transmitted through the orbiting scroll shaft 55 fitted in the eccentric hole 42 of the crankshaft to the orbiting scroll 2, and the latter orbits with the aid of the Oldhams coupling 34 mounted on the bearing support 7, resulting in a compression operation as shown in FIG. 1 Gas, such as Freon, is sucked through hole 28 in the bottom plate 27, the air gap between the rotor 8 and the stator 9, and a gap between the stator 9 and the shell 23 to the intake port 44 (FIG. 3) of the bearing support 7. This gas then flows through the communication passage 48 to the compression chamber 4 between the orbiting scroll 2 and the stationary scroll 1.

A lubricating oil supply system for the unit includes an oil separator (not shown) which may be housed in the discharge chamber 20. Oil separated by the separator flows through the oil hole 33 formed in the stationary scroll 1 and the oil hole 33 formed in the bearing support 7 to the metal bearing sleeve II 37, and then through the oil hole 33 seen in FIG. 10 and the oil grooves I 62 and II 63 to the thrust bearing 35, the metal bearing sleeve III 39 and the thrust receiver 38. A portion of the oil from the thrust bearing 35, together with the gas, is taken into the compression chamber. Oil flowing from the thrust receiver 38 and the metal bearing sleeve III 39 flows into the interior of the shell 23 and is atomized at a rate depending upon the flow rate of the gas and the action of the stirrer 18. The atomized oil, together with the gas, is taken into the compression chamber. Oil in the compression chamber 4 fills radial and axial gaps between the wrap 49 of the stationary scroll 1 (FIG. 5a) and the wrap 53 of the orbiting scroll 2 to thus minimize the leakage of the gas. Oil from the thrust bearing 35 lubricates the respective sliding surfaces of the members of the Oldhams coupling 34. Oil entering the discharge chamber 20 in this manner is separated again by the separator and forced to the oil supply line by the pressure of the discharging gas. On the other hand, oil which is not separated out by the oil separator circulates through the compressor with the refrigerant (when the compressor is used as in a refrigerator or air conditioner) and is returned to the hole 28 together with the gas. It is also possible to provide an oil separator outside the discharge chamber 20.

A protection circuit connected through the terminal 40 to the stator winding detects any overload of the stator 9 or an abnormal increase of temperature to cut off the three-phase a.c. source feeding the stator winding.

As mentioned previously, the stirrer 18 shown in FIG. 13b is secured to the end ring 75 of the rotor 8 and serves as a centrifugal fan for stirring and splashing lubricant oil, which would otherwise tend to stay in the bottom of the shell 23, to reuse it together with flowing gas. The stirrer 18 may take the form of a centrifugal fan having flat fins and can be manufactured by a simple pressing operation.

In the conventional scroll type compressor, it is usual to form the oil grooves in the surface of the thrust bearing support 7 as shown in FIG. 8. In such a case, however, an oil membrane formed between the rear surface of the orbiting scroll 2 and the flat surface of the thrust bearing support 7 cannot have the desired wedge shape, and thus the load capacity of the compressor is relatively small. Further, if the orbiting scroll 2 is deformed by a thrust force, the flat thrust bearing support 7 cannot follow such deformation, causing the load to be received by the inner periphery of the thrust bearing support 7.

Moreover, in the conventional scroll type fluid machine described above, if the thrust load applied by the orbiting scroll 2 becomes excessive, only a very small lubricating oil membrane will be produced between the rear surface of the orbiting scroll 2 and the thrust bearing support 7, resulting in consumption of the oil. This occurs because the thrust bearing is flat. Further, if the orbiting scroll 2 is deformed by a thrust force, the bearing support 7 cannot follow such deformation, and hence the thrust load is received by only a portion of the thrust bearing support 7. In any case, in the conventional structure, an oil reservoir for reserving lubricant oil must be provided peripherally of the thrust bearing support 7, causing the structure to be very complicated.

SUMMARY OF THE INVENTION

The present invention, made in view of the defects of the conventional scroll type compressor discussed above, provides a scroll type fluid machine which has a thrust bearing capable of supporting the thrust force acting on the orbiting scroll while tilting radially and peripherally (referred to as a "tilting pad-type thrust bearing" hereinafter) to make automatic formation of a wedge shaped oil membrane possible, and also accommodating possible deformation of the orbiting scroll.

Further, the invention provides a scroll type fluid machine in which lubricating oil is supplied to a thrust bearing smoothly, even if the thrust load is very large, and also since the thrust bearing can accommodate the deformation of the orbiting scroll, it is not always necessary to have an oil reservoir.

BRIEF DESCRIPTION OF THE DRAWINGS

FIG. 20A is a perspective view of a segment of the thrust bearing in FIG. 17;

FIG. 20B is a perspective view of a lower portion thereof;

FIG. 21 shows oil grooves provided in each segment of the thrust bearing;

FIG. 26 is a cross sectional view of a portion of a scroll type hydraulic machine according to a preferred embodiment of the present invention;

DESCRIPTION OF PREFERRED EMBODIMENTS

A preferred embodiment of the present invention will be described with reference to the drawings.

Figure 17:
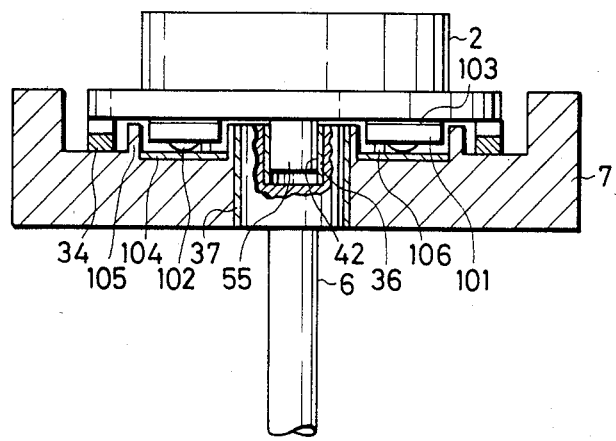
FIG. 17 is a cross-sectional view of a thrust bearing of a preferred embodiment of the present invention.

In FIG. 17, reference numeral 2 depicts an orbiting scroll, 6 a crankshaft acting as a driving source for the orbiting scroll 2, 7 a bearing support, 34 an Oldhams coupling for preventing the orbiting scroll 2 from rotating about its axis, 36 a metal bearing sleeve I for rotatably supporting an orbiting scroll shaft 55, and 37 a metal bearing sleeve II for reducing the frictional forces between the bearing support 7 and the crankshaft 6. The shaft 55 of the orbiting scroll 2 is fitted in a hole 42 formed eccentrically in the crankshaft 6. Reference numeral 101 depicts a tilting pad type thrust bearing, 102 a ball pivot, 103 a metal bearing sleeve used to minimize friction, 104 a washer whose surface is hardened to receive a concentrated load of the ball pivot 102, 105 an oil reservoir whose wall height is substantially the same as that of the tilting pad type thrust bearing 101, and 106 an anti-rotation member for the thrust bearing 101.

Figure 1:
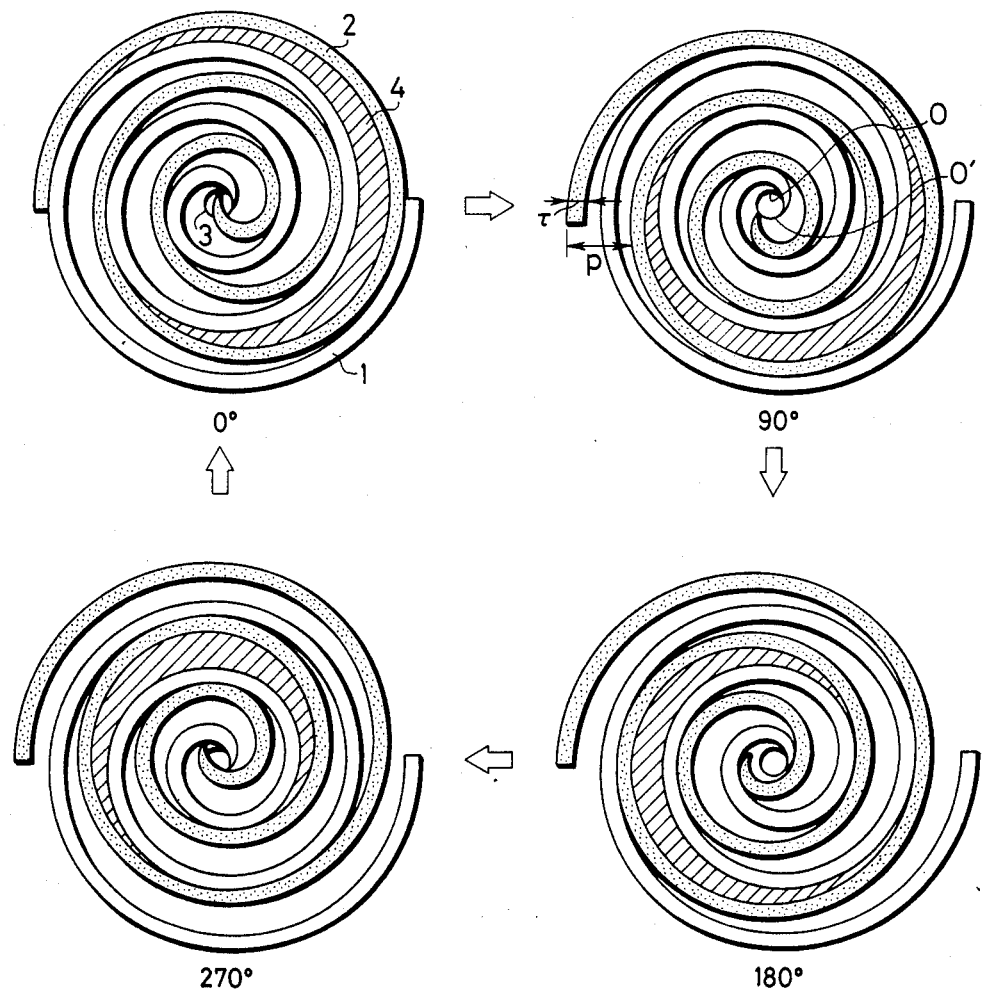
FIG. 1 illustrates operating principles of a scroll type compressor.
Figure 2:
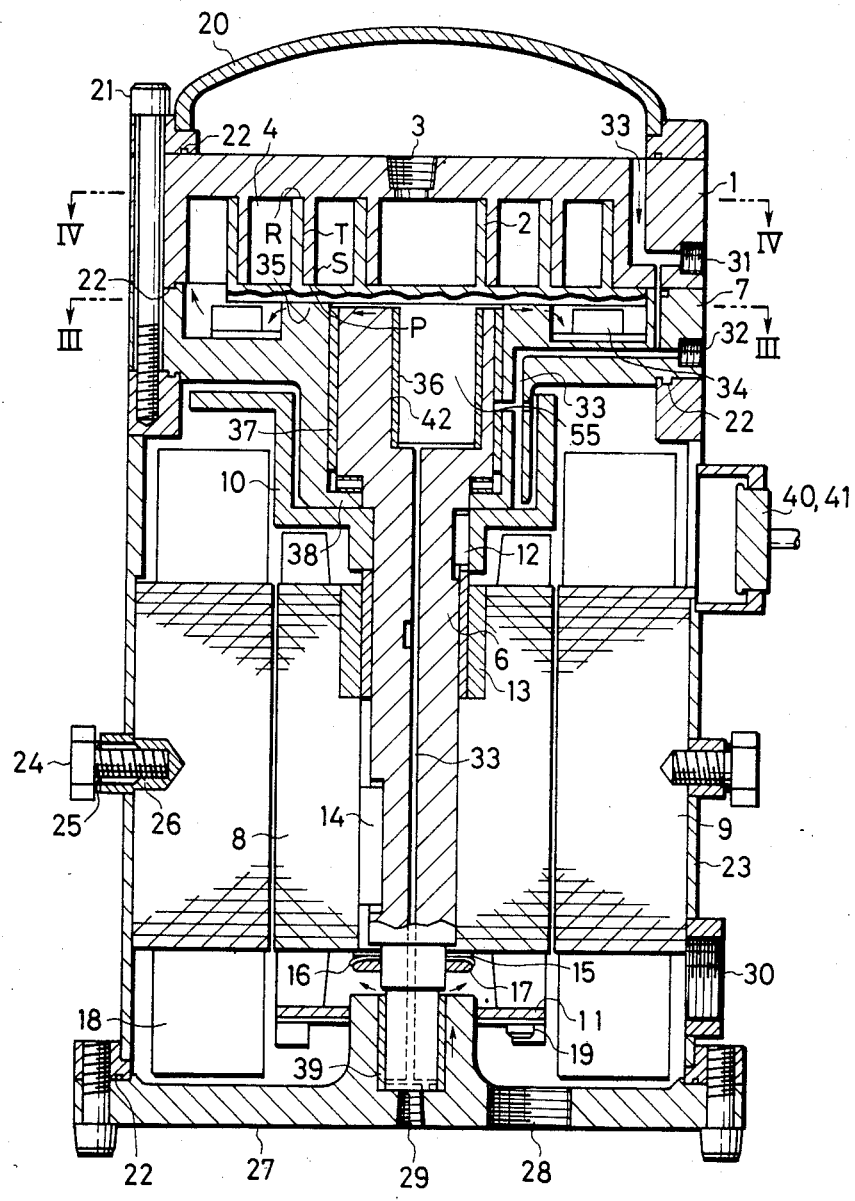
FIG. 2 is a cross section of a conventional scroll type compressor.
Figure 3:
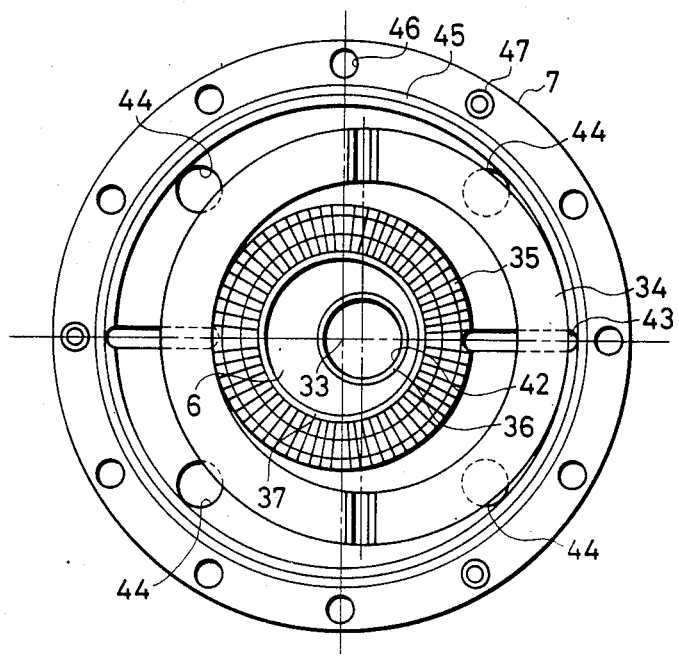
FIG. 3 is a cross section taken along a line III—III in FIG. 2.
Figure 4:
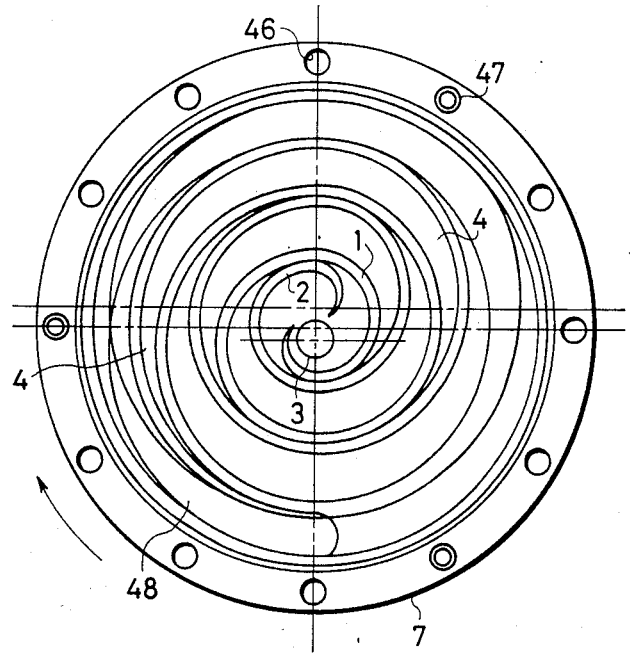
FIG. 4 is a cross section taken along a line IV—IV in FIG. 2.
Figure 5A:
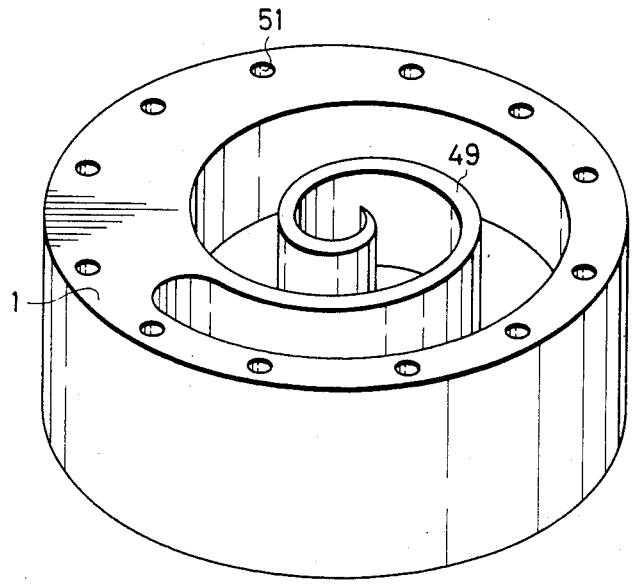
FIG. 5a is a perspective view of a lower portion of a stationary scroll.
Figure 5B:
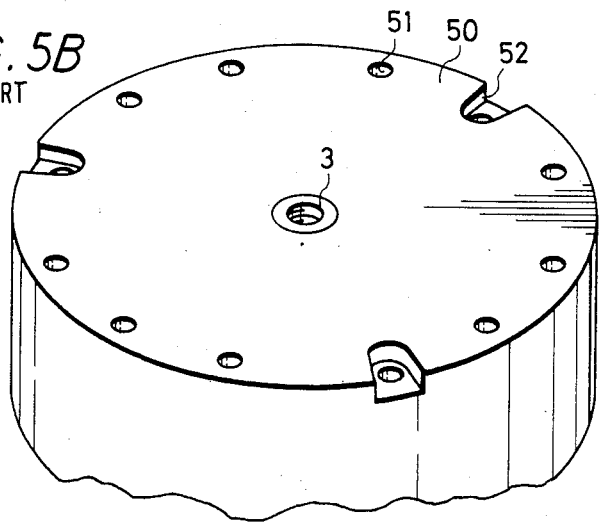
FIG. 5b is a bottom view of the stationary scroll.
Figure 6:
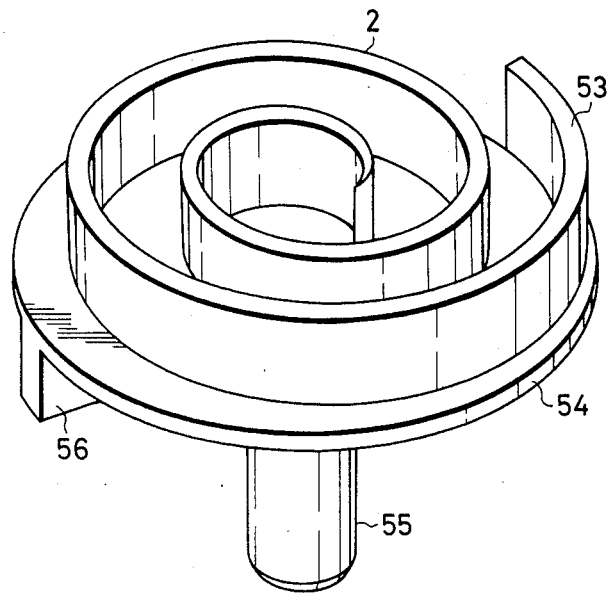
FIG. 6 is a perspective view of an orbiting scroll.
Figure 7:
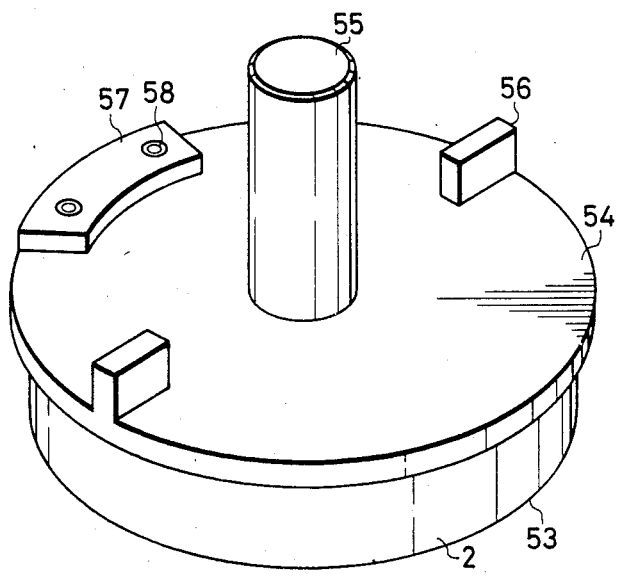
FIG. 7 is a rear side view of the orbiting scroll.
Figure 8:
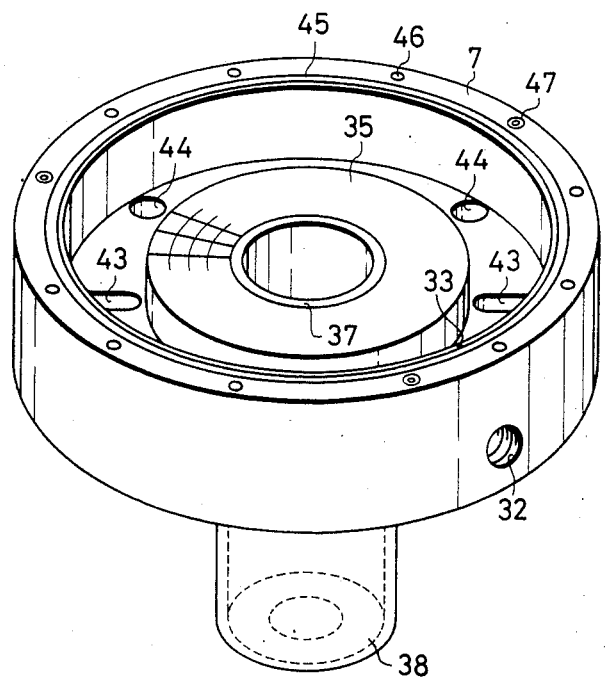
FIG. 8 is a perspective view of a bearing.
Figure 9:
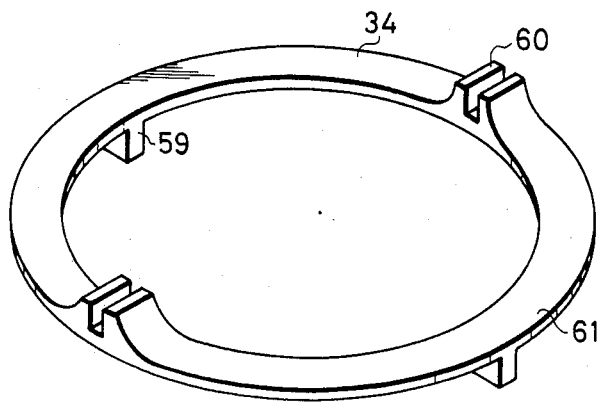
FIG. 9 is a perspective view of an Oldhams coupling.
Figure 11:
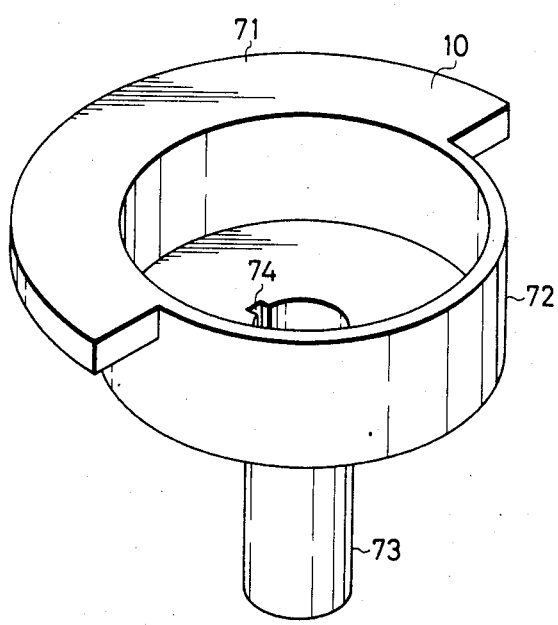
FIG. 11 is a perspective view of a first balancer.
Figure 10:
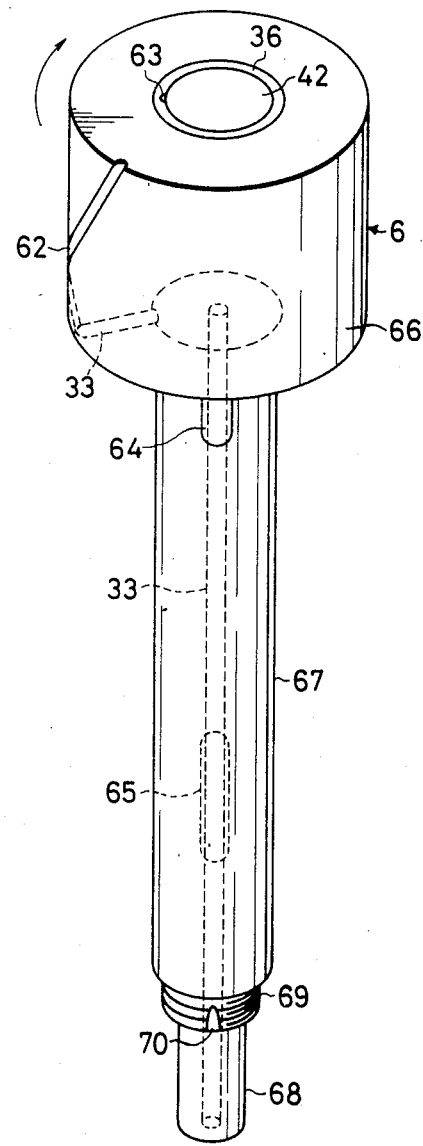
FIG. 10 is a perspective view of a crankshaft.
Figure 12:
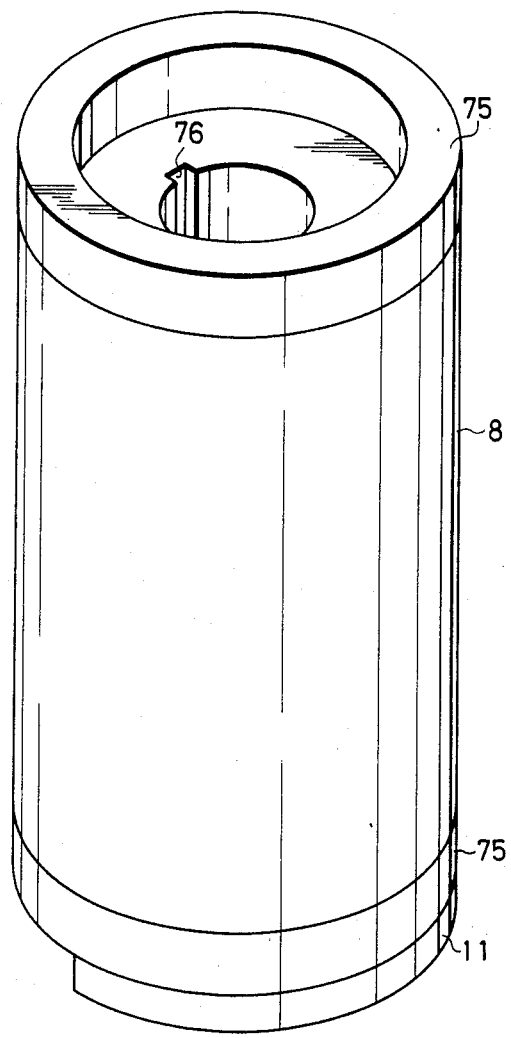
FIG. 12 is a perspective view of a rotor of an electric motor.
Figure 13A:
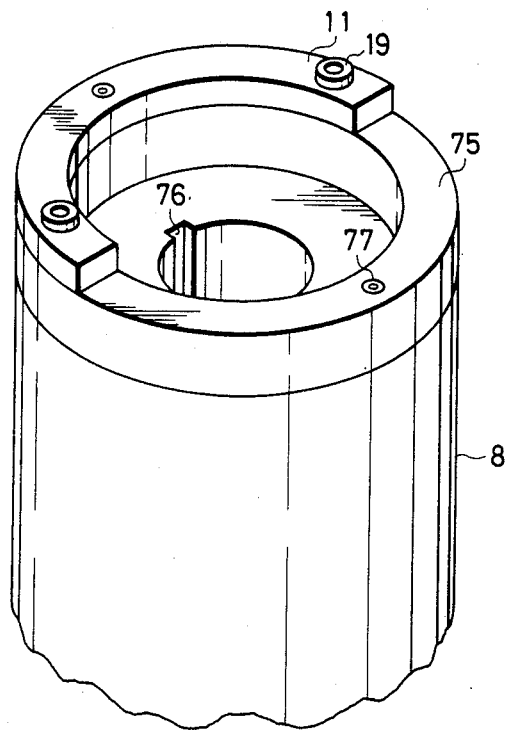
FIG. 13a is a perspective view of a lower portion of the rotor.
Figure 13B:
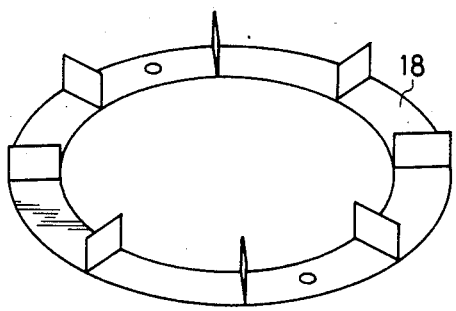
FIG. 13b is a perspective view of a stirrer.
Figure 14:
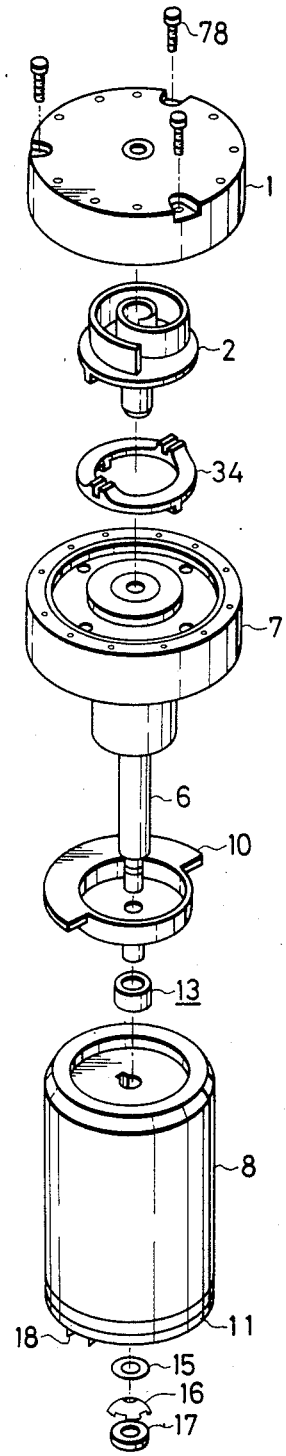
FIG. 14 shows the assembly of the compressor.
Figure 15:
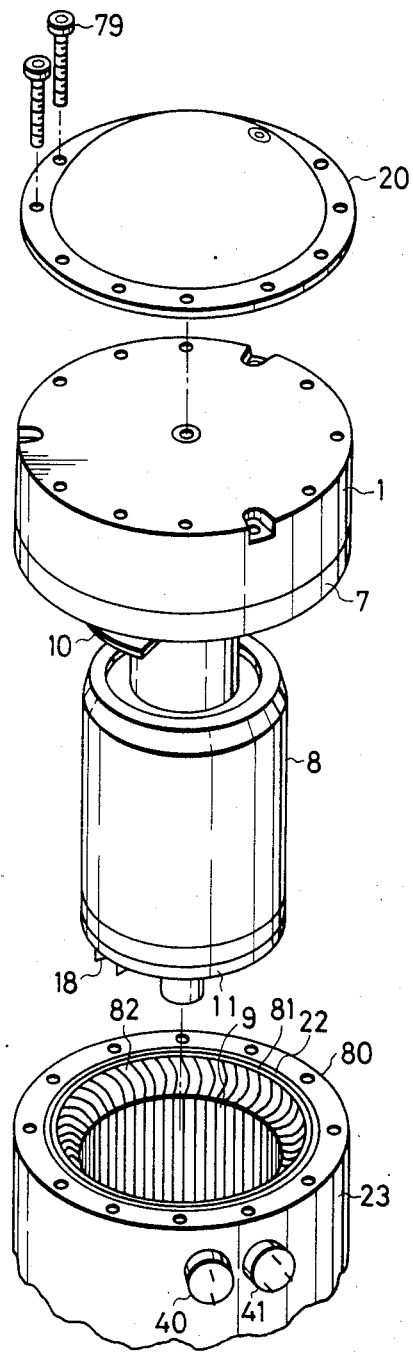
FIG. 15 and 16 show the assembly of the compressor.
Figure 16:
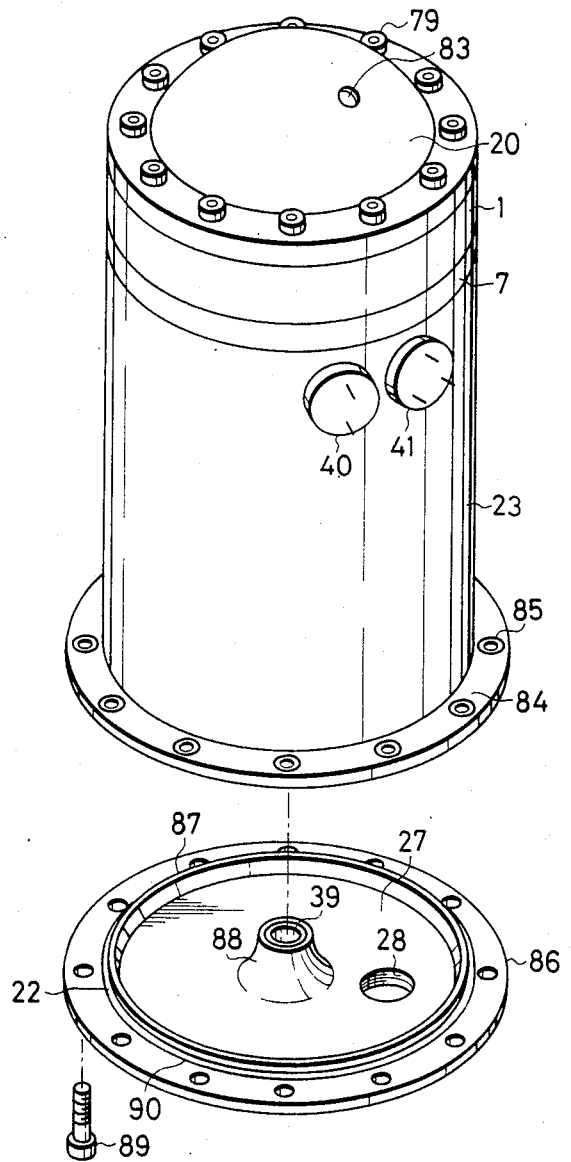
Figure 18:
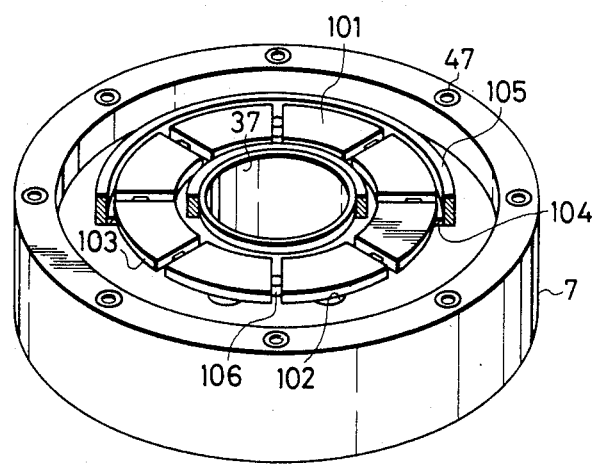
FIG. 18 is a perspective view of the thrust bearing in FIG. 17.

With reference to FIG. 17, assuming that the machine is used for example, as a sealed-type refrigerator compressor using a low pressure, when the orbiting scroll 2 orbits as shown in FIG. 1, a downward thrust is produced which is transmitted to the thrust bearing 101. Since the orbiting scroll 2 does not rotate but orbits, the oil membrane formation on the bearing metal surface of the thrust bearing 101 is different from that in the usual case. Specifically, with the invention, formation of a wedge-shaped oil membrane can occur even in the case of orbital movement. Thus, as the tilting pad type thrust bearing 101 tilts slightly, with the ball pivot 102 acting as a fulcrum, a wedge-shaped oil membrane is formed so that thrust load is supported by the oil pressure produced by the membrane. Rotation of the thrust bearing 101 about the ball pivot 102 is prevented by the anti-rotation member 106 which should be fixed to the member 7. Since a large thrust is applied to the surface with which the ball pivot 102 is in contact, the washer 104, having a hardened surface, prevents the bearing support 7 from being deformed. Further, in order to smooth the sliding surface of the bearing metal 103 of the tilting pad type thrust bearing 101, an annular wall whose height is substantially the same as that of the thrust bearing 101 is provided surrounding the thrust bearing to form the oil reservoir 105. The height of the annular wall should be slightly less than the height of the thrust bearing to preventing the orbiting scroll from being supported on the walls 105. Oil collected in the reservoir 105 underneath the thrust bearing is to be provided to the upper surface of the thrust bearing between the thrust bearing and the orbiting scroll. In this regard, there is clearance between adjacent sectors of the thrust bearing, as shown in FIG. 18. There will be some "splashing" motion during movement of the thrust bearing, but the supply of oil to locations above the oil reservoirs primarily results when oil is forcibly supplied through oil ports such as shown at 29 and 32 in FIG. 2, by a pump or due to a pressure differential, thereby resulting in the level of oil in the annular space inside the reservoir being pushed up to the level of the bearing surface 103.

FIG. 18 is a perspective view of the bearing support 7 in FIG. 17. As is clear from FIG. 18, the tilting pad type thrust bearing 101 is composed of a plurality of pads so that the thrust bearing 101 has an angular stiffness, even when an overturning moment acts on the orbiting scroll 2. For this purpose, the number of the pads should be at least three.

Figure 19:
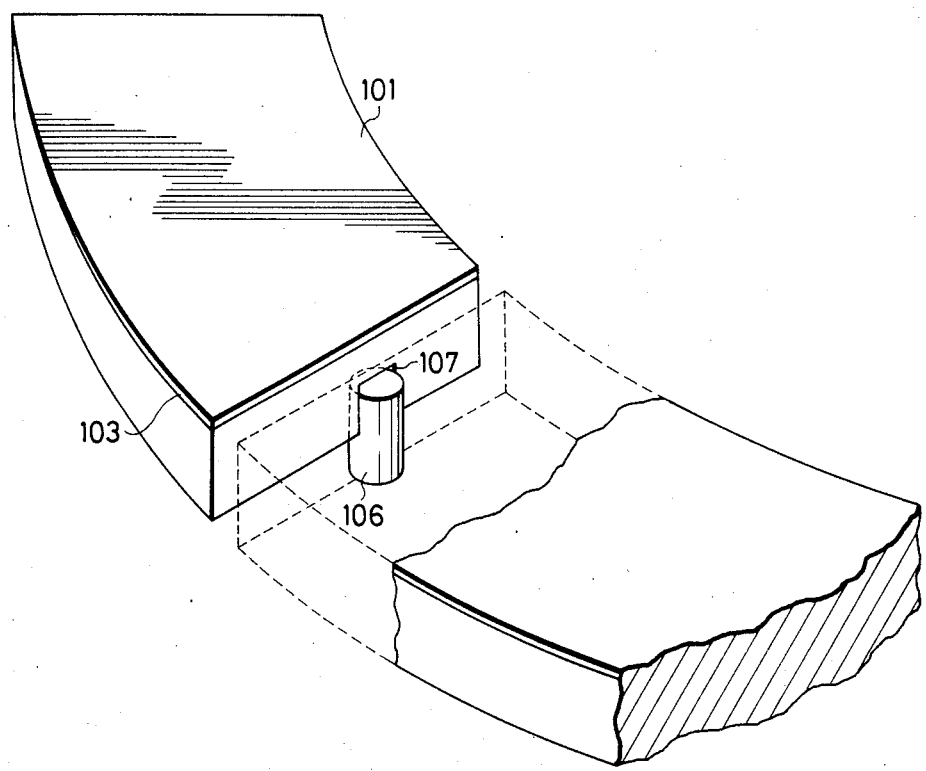
FIG. 19 shows an anti-rotation structure for the thrust bearing shown in FIG. 17.

In order to support the orbiting scroll 2, the thrust bearing 101 is provided with the anti-rotation member 106 for preventing its movement along the periphery. For this purpose, at least two such members are necessary for each pad. In order to reduce the number of the members 106, each member 106 is commonly used for its adjacent two pads as shown in FIG. 19. The structure of each pad is shown in FIGS. 20A and 20B in detail.

Figure 22:
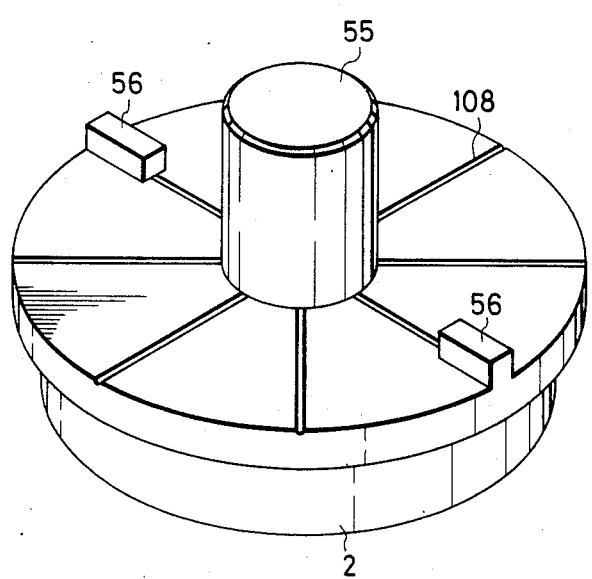
FIG. 22 shows an oil groove formed in the orbiting scroll.

As is clear from FIG. 20B, each pad is formed in its rear surface with a ball pivot 102 and, in opposite end portions thereof, with anti-rotation grooves 107. Further, in order to improve the supply of oil, the smaller of the peripheral length and the radial length is desirably in a range from the orbital radius to about four times the orbital radius. If the thrust bearing 101 is substantially large with respect to the orbital radius, it is desirable to form oil grooves 108 in the pad surface to improve the oil supply, as shown in FIG. 21. Alternatively, the same effect can be attained by the provision of oil grooves 108 in the rear surface of the orbiting scroll 2, as shown in FIG. 22. The pattern of the oil grooves 108 is not limited to the radial pattern shown in FIGS. 21 and 22. Lattice patterns and circular patterns may be used with similar effects.

Figure 23:
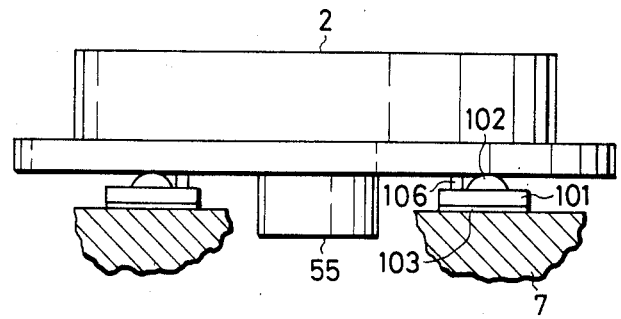
FIG. 23 is a cross section showing an embodiment in which the thrust bearing is secured to a back surface of the orbiting scroll.

Although, in this embodiment, the thrust bearing 101 is disposed on the bearing 7 and supports the rear surface of the orbiting scroll 2, it is possible to secure the thrust bearing 101 for rotation with the rear surface of the orbiting scroll 2, as shown in FIG. 23. In such a case, the thrust bearing 101 orbits together with the orbiting scroll. In FIG. 23, one of the members 106 should be fixed to the orbiting scroll 2.

Figure 24:
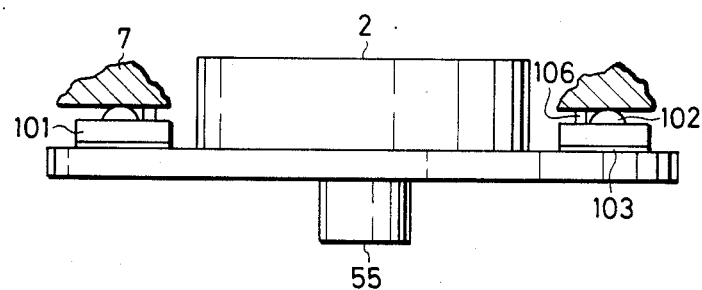
FIG. 24 is a cross section showing another embodiment in which the thrust bearing is disposed to support the outer periphery of the orbiting scroll at the side of the stationary scroll.

FIG. 24 shows another embodiment of the present invention, in which the thrust bearing 101 of the tilting pad type is disposed on the bearing 7 in such a manner that it supports the outer periphery of the orbiting scroll 2 at the side of the stationary scroll 1. This is effective to apply a back pressure to the orbiting scroll 2 and produce a thrust toward the stationary scroll 1 when the machine is used as a sealing type or semi-sealing type compressor having a high pressure shell. The embodiment of FIG. 24 is designed to operate in conditions in which a negative pressure higher than the thrust pressure is applied to the orbiting scroll, e.g., as occurs in a semi-sealing type compressor having a high pressure shell. As in the embodiment of FIG. 17, the anti-rotation members 106 in FIG. 24 should be fixed to the member 7.

Figure 25:
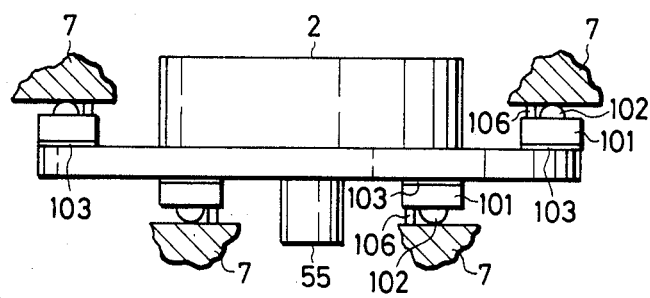
FIG. 25 is a cross section showing another embodiment in which the thrust bearings support the orbiting scroll at both sides thereof.

FIG. 25 shows another embodiment in which both surfaces of the orbiting scroll 2 are supported by the thrust bearings 101 to thereby accommodate thrust in any direction. The anti-rotation members 106 should be fixed to the member 7.

Another embodiment of the present invention is shown in FIG. 26.

In FIG. 26, reference numeral 101' depicts a thrust bearing pad, 103 a metal bearing sleeve for minimizing the frictional force between the thrust bearings, 102 a ball pivot, 55 an orbiting scroll shaft, 201 and 202 respective radially inner and outer side walls of an annular groove formed in a bearing support 7 for holding lubricant oil, and 119 a metal seat whose surface hardness is suitable for receiving the load of the ball pivot 102 concentrically. The tilting pad type thrust bearing of this embodiment is supported by the annular groove defined by the side walls 201 and 202 and is designed so that it receives a thrust load from the base plate of the orbiting scroll 2 while tilting radially and peripherally. Circumferential movement of the thrust bearing pads in the annular groove defined by walls 201, 202 is prevented by frictional forces at the top portions of the pivots 102.

Figure 27A:
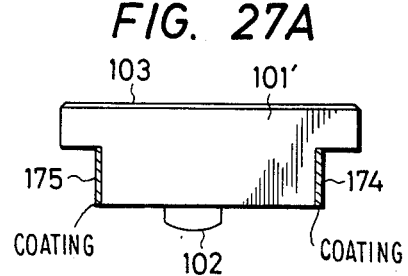
FIG. 27A and 27B are side and plan views of a thrust bearing pad according to another embodiment of the present invention.
Figure 27B:
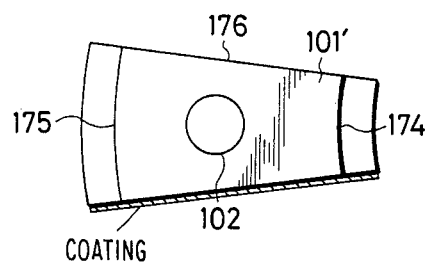

FIG. 27A is a side view of the thrust bearing pad 101', and FIG. 27B is a bottom view thereof. As is clear from FIGS. 27A and 27B, the pad 101' has inner and outer stepped portions 174 and 175 which correspond to the respective side walls 201 and 202 of the groove, with the pad 101 being received in the groove. Therefore, an anti-rotation macheniam such as shown in FIGS. 19 and 20 is unnecessary since rotation is restricted by the contact of the stepped portions 174 and 175 with the respective groove side walls 201 and 202.

Small gaps are provided between adjacent thrust bearing pads 101' and between the annular groove and the thrust bearing pads 101', respectively, so that peripheral and radial tilting movements of the thrust bearing pads 101' about the ball pivots 102 are permitted. As mentioned previously, since the individual points of the base plate of the orbiting scroll 2 rotate with a small radii during the orbital movement thereof, there is substantially no case where the thrust bearing pads 101' move peripherally along the annular groove.

Since the thrust bearing pads 101' are supported at a low level by the annular groove, lubricating oil tends to concentrate in the annular groove without the provision of a special oil reservoir, and therefore the supply of oil to the metal bearing surfaces 103 is facilitated.

In another embodiment of the present invention, the inner and outer side surfaces 201 and 202, side steps 174 and 175 of the thrust bearing pad 101' which correspond to the side surfaces 201 and 202, respectively, and side surfaces 176 thereof are coated with a material such as Teflon to reduce the amount of friction between there members.

Figure 28:
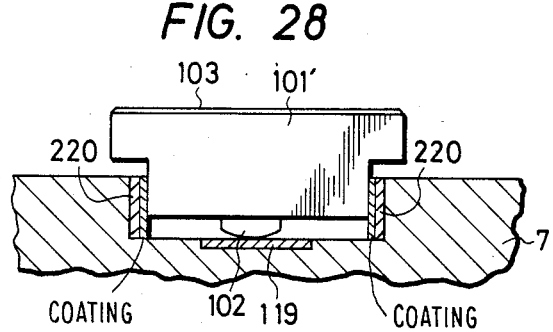
FIG. 28 is a cross-sectional view of a thrust bearing according to another embodiment of the present invention.

FIG. 28 shows another embodiment of the present invention in which resilient members 220, made of a material such as rubber, are disposed between the thrust bearing pads 101' and the annular groove of the bearing support 7 so that direct contact of the thrust bearing pads 101' with the side surfaces of the annular groove is prevented while permitting a small tilting movement of the pads toward the side surfaces. The effects of this embodiment are substantially the same as those of the previously described embodiments.

Although the present invention has been described as being applied to a scroll type compressor, it is also applicable to a scroll type vacuum pump with the same effect.

As mentioned hereinbefore, according to the present invention, a thrust bearing which can tilt radially and peripherally is used to support the thrust imposed on the orbiting scroll by the automatically formed wedge shaped oil membrane resulting from the tilting movement. Further, since the structure can follow any deformation of the orbiting scroll, the resultant scroll type hydraulic machine is highly reliable and has a high efficiency.

We claim:

1. A scroll type machine comprising:
    a stationary scroll,
    an orbiting scroll combined with said stationary scroll,
    means for preventing rotation of said orbiting scroll about its axis,
    a crankshaft driven rotatably by a driving source to orbit said orbiting scroll,
    a thrust bearing for receiving a thrust force applied by said orbiting scroll, said thrust bearing comprising at least three sectors capable of separately tilting radially and peripherally, and
    a bearing support for supporting said thrust bearing, a portion of said thrust bearing supported by said bearing support having the form of a ball.

2. The scroll type machine as claimed in claim 1, further comprising means for inhibiting peripheral movement of said thrust bearing.

3. The scroll type machine as claimed in claim 1, further comprising an anti-rotation member provided between adjacent ones of said sectors for preventing peripheral movement of said thrust bearing.

4. The scroll type machine as claimed in claim 1, wherein said thrust bearing is surrounded by a annular portion whose height is substantially the same as that of said thrust bearing.

5. The scroll type machine as claimed in claim 1, further comprising an annular ring having a high surface hardness for supporting said ball portion of said thrust bearing.

6. The scroll type machine as claimed in claim 1, wherein said thrust bearing comprises a plurality of a smaller sectors, one of a peripheral length and a radial length of each sector being within a range from an orbital radius of said orbiting scroll to about four times said orbital radius.

7. The scroll type machine as claimed in claim 1, wherein said thrust bearing has a thrust surface serving as a lubricating oil groove.

8. The scroll type machine as claimed in claim 1, wherein said orbiting scroll has an oil groove in a sliding surface thereof by which it is supported by said thrust bearing.

9. The scroll type machine as claimed in claim 1, wherein a pivot side of said thrust bearing is positioned at a side of said orbiting scroll.

10. The scroll type machine as claimed in claim 1, wherein said thrust bearing supports said orbiting scroll at a rear surface thereof.

11. The scroll type machine as claimed in claim 1, wherein said thrust bearing supports said orbiting scroll at a surface thereof at a side of said stationary scroll.

12. The scroll type machine as claimed in claim 1, wherein said thrust bearing supports said orbiting scroll at a rear surface thereof and at a surface thereof at the side of said stationary scroll.

13. The scroll type machine claimed in claim 1, wherein said thrust bearing is supported by an annular groove serving as a lubricating oil reservoir.

14. The scroll type machine as claimed in claim 13, wherein said annular groove is coated with a material having a low coefficient of friction.

15. The scroll type machine as claimed in claim 13, wherein said thrust bearing has radial side surfaces contacting said annular groove, said radial side surfaces being coated with a material having a low coefficient of friction.

16. The scroll type machine as claimed in claim 13, wherein said thrust bearing comprises a plurality of bearing sectors, each of said bearing sectors having side surfaces facing to side surfaces of adjacent bearing sectors and being coated with a material having a low coefficient of friction.

17. The scroll type hydraulic machine as claimed in claim 13, further comprising a resilient member disposed between said annular groove and said thrust bearing.

* * * * *